United States Patent Office 3,606,804
Patented Sept. 21, 1971

1

3,606,804
DEVICE FOR THE APPLICATION OF A TURRET HEAD TO A WORKPIECE
Max Gotz, 2 Monbachweg, 722 Schwenningen (Neckar), Germany, and Werner Sonnek, 76 Breslauerstrasse, 7313 Reichenbach (Fils), Germany
Filed July 1, 1969, Ser. No. 838,295
Claims priority, application Germany, July 10, 1968, G 67 50 293
Int. Cl. B23q *17/18*
U.S. Cl. 74—820                                5 Claims

ABSTRACT OF THE DISCLOSURE

An apparatus for the application of a turret head to a workpiece wherein the feed or advancing movement of the turret head is derived from a first control cam mounted upon a main control shaft and wherein the displacement movement which occurs in connection with the indexing of the turret head is derived from a second control cam. The displaceable turret head is adapted to be held against the two control cams by means of a spring. According to important aspects of the invention, the second control cam is disposed between a transmission member cooperating with the first control cam and a shaft rotating with the switch gear of the turret head and mounted in the housing of the turret head.

---

The present invention concerns a new and improved device for the application of a turret head to a workpiece wherein the feed movement of the turret head is derived from a control cam mounted on a main control shaft and wherein the displacement movement in conjunction with the indexing or control of the turret head is derived from a second control cam, the displaceable turret head being held against both control cams by means of a spring.

In a known control device, the turret head is pushed longitudinally by means of a control cam rotating with the main control shaft. A counter or intermediate shaft transmitting the displacement movement to the carriage of the turret head and located between the rotating control cam and the turret head carriage, can be driven by means of a system of levers with removable rigidity from the main control rod on the one hand and from a rotating spindle independent of the main control shaft on the other hand. The spindle draws the turret head back over the travel of the control cam, switches it thereby and at the same time removes the rigidity of the system of levers between the main control shaft and the countershaft. A toggle joint whose position is determined by means of a slide controlled by a third control cam serves this purpose. The object of the invention is to provide a simply designed device while utilising available mechanisms, wherein the course of kinematic movement can be freely selected. This object is obtained according to the invention in that the second control cam is arranged between a transmission member cooperating with the first control cam and a shaft mounted in the housing or casing of the turret head and rotating with the switch gear of the turret head. Because of the free selection of the course of kinematic movement due to any desired design of the control curves a quicker and reboundless and shock free control operation is obtained, i.e. the working tools in the turret head, on further control thereof may be withdrawn very quickly and after the control operation again brought into the working position, because the masses to be accelerated and slowed down are exceptionally small. The device is simply constructed in an exposed arrangement resulting in the advantage that it is economical to manufacture,

2 install and service. Since only a few moving parts are present rigid transmission conditions prevail.

An advantageous first embodiment of the invention contemplates that the second control cam designed as a radial cam is on the same shaft with a driving disc of the Maltese cross drive arrangement and cooperates with an axially displaceable tappet which is connected to the first control cam by means of a double lever. The radial cam is conveniently designed as a disc cam.

In order that the turret head during the rotation of the second control cam remains for a short time in its positions nearest to and most remote from the head stock, the second control cam is designed at regions or zones most remote from and nearest to the axle in the form of an arc. The magnitude of the region of the most remote position is determined by the engagement of a driving pin in a disc of the Maltese cross. Thus an exact fixing of the stopping location of the turret head is superfluous.

A second preferred embodiment consists in the second control cam designed as an axial cam arranged on a shaft lying parallel to the axle of the first control cam, which can be rotated by the switch gear or drive of the turret head, and in that the transmission member may be displaced parallel to the axles of both control cams.

An advantageous further improvement of the invention is manifested by the features that the transmission member receives a spring through which a rod passes, which is supported by another spring opposite a stationary part.

Two turret heads of a single spindle automatic lathe are shown schematically in the drawings, by way of example only, as an embodiment of the subject matter of the invention and in which:

FIG. 4 is an elevation, corresponding to FIG. 2, of a second embodiment;

FIG. 5 is an elevational view taken in the direction of the arrow A in FIG. 4 and partly in section along line V—V in FIG. 4.

Figure 1:
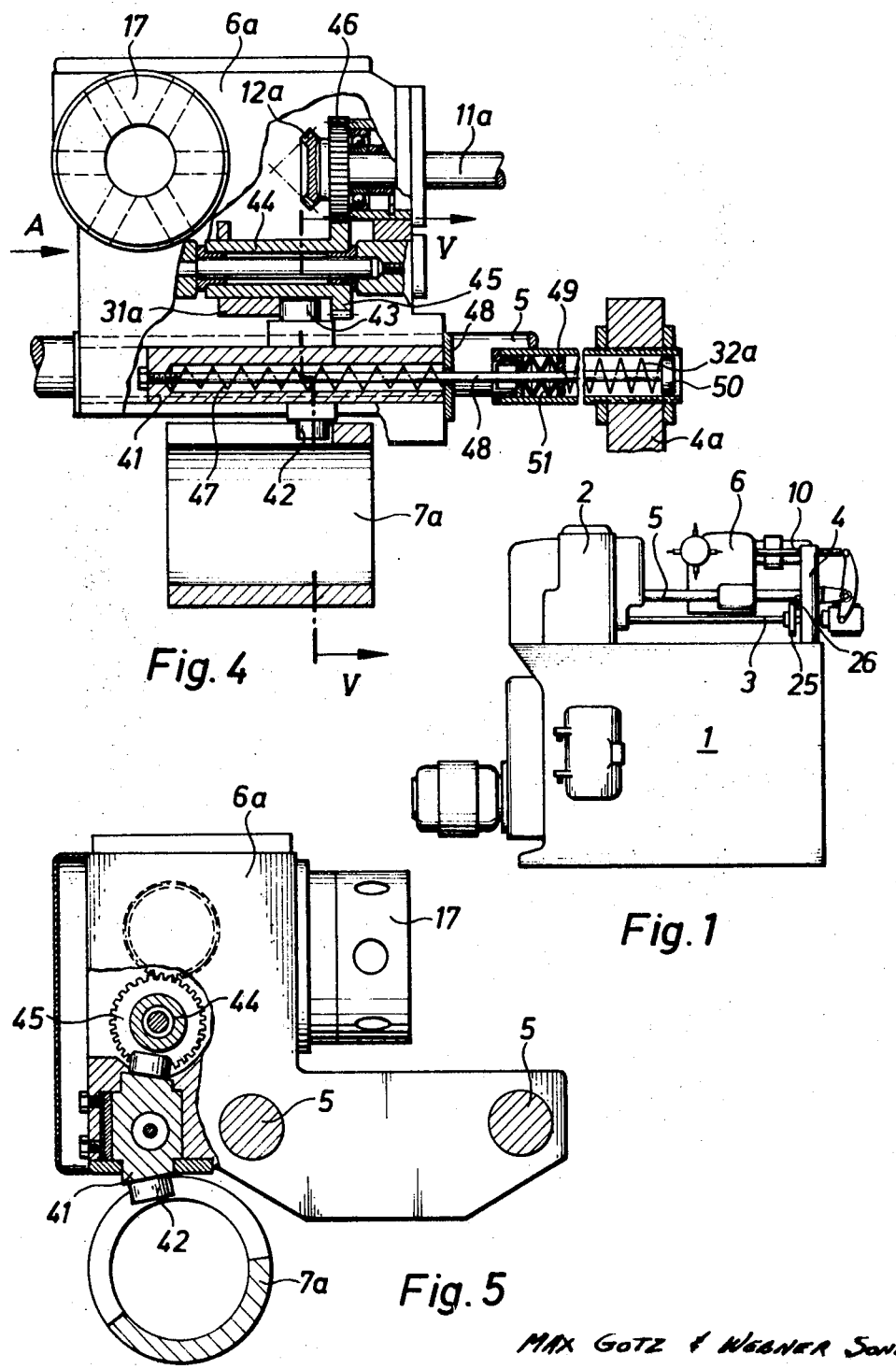
FIG. 1 is a front elevation of a single spindle automatic lathe.

A head stock 2 is located on a bed 1 of a single spindle automatic lathe, through whose spindle a rod-shaped workpiece is to be fed to the machining position. A main control shaft 3 is to be driven by the head stock 2 and is mounted in a carrier 4 lying on the opposite side of the bed 1 with respect to the head stock 2. Two guide rods 5 extend between the head stock 2 and the carrier 4. The turret head support housing 6 designed as a slide or carriage is mounted for axial displacement on the guide rods 5. A driving motor 10, for example an electric motor, hydraulic motor or the like is arranged at the side of the housing 6 remote from the head stock 2, and is provided with a braking device (not shown) which endeavours to stop a driving shaft 11 of the motor 10 as soon as the latter is switched off. The driving shaft 11 drives an indexing means including a driving disc 14 by means of a bevel gear arrangement 12, 13 on an idler shaft (not numbered) and the disc 14 carries a driving pin 15. The latter engages in one of a plurality of slots or cut-outs of a Maltese cross disc 16, which is mounted on a switching or indexing shaft 18 carrying a turret head of tool holder 17 and also forming a part of the indexing means.

The tool holder 17 has a number of recesses 19 corresponding to the number of tools to be received by it. An index pin 20 is arranged to engage in one of these recesses and is operable by means of a double lever 21. A cam 22 connected to the driving disc 14 serves to operate this lever. This driving disc 14 carries a lifter or cam 23 which cooperates with a switch 24 arranged on the housing 6. This serves to switch off the electric motor 10. The latter is adapted to be switched on by means of a control disc 25, mounted on the control shaft 3, which cooperates with a switch 26 mounted on the carrier 4. Any other driving motor may be used or a drive derived from a control shaft.

Figure 2:
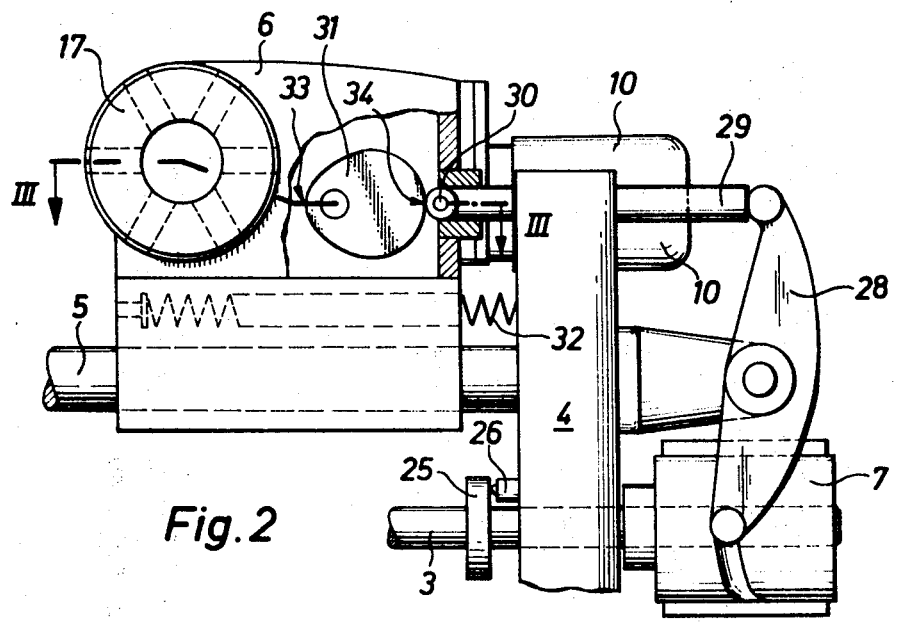
FIG. 2 is a part sectional elevation of the first embodiment shown in FIG. 1 on a larger scale.
Figure 3:
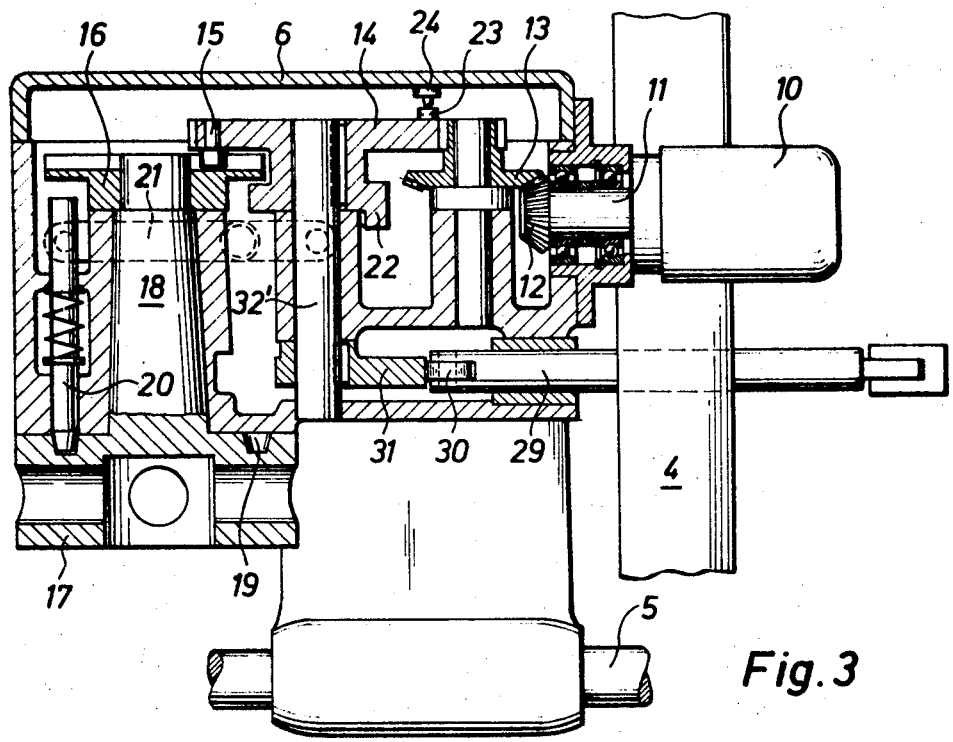
FIG. 3 is a section along the line III—III of FIG. 2 on a larger scale.

A progression or first feed control cam 7 is mounted on the control shaft 3 which cooperates with a transmission means in the form of a double arm lever 28 pivotably mounted on the carrier 4, and of which one end engages in a recess of the progression control cam 7, while its other end rests against the rear end of a tappet 29, the other end of which carries a cam follower or roller 30, which also form a part of the transmission means. This roller 30 rests against a second control or disc cam 31 which is keyed to a shaft 32' carrying the driving disc 14 which is non-rotatable relative to the transfer shaft 32'. The tappet 29 is adapted to displace axially in both the carrier 4 and the housing 6. A spring 32 (FIG. 2) fixed on the one hand to the end of the housing 6 adjacent the head stock 2 and on the other hand to the carrier 4, seeks to draw the housing 6 in the direction of the carrier 4 and thereby to apply the second control disc or cam 31, the tappet 29, the double-arm lever 28 and the progression control cam 7 against one another. The double-arm lever 28 may be omitted, if the control cam 7 is so arranged that its point of contact with the tappet 29 lies substantially in the axial direction thereof. In this case the control cam is preferably constructed as a disc cam. The progression or feed control cam 7 may also be constructed as a flat cam having a transverse extending control shaft. During one revolution or rotation of the control shaft 3 the turret head is applied to the workpiece disposed in the headstock by means of the progression or feed control cam 7 and the machining operation or process is carried out. After completion of the machining operation, the turret head is removed from the head stock by the amount of the feed path. At the end of the return travel the indexing or switching of the turret is initiated. The control disc 25 operates the switch 26 whereby the driving motor 10 starts up and, by means of the Maltese cross gear or indexing arrangement 15, 16, after lifting the index pin 20, indexes or advances the tool holder 17 so that the next tool comes into its operational position. After again securing the position of the tool holder 17 by means of the index pin 20, the cam 23 switches off the switch 24 whereby the electric motor 10 is switched off and is rapidly stopped by means of the braking device. The disc cam 31 connected to the drive disc 14 carries out one revolution during the switching or indexing of the Maltese cross indexing arrangement 15, 16 whereby due to the action of the spring 32, the housing 6 is moved further from the head stock 2 and returned to its initial position. The second control cam 31 is designed such that, when its region on zone with the smallest radius bears against the roller or follower 30, and the second control or disc cam 31 describes an angle at the centre of substantially 120°, the turret head 17 will rotate or turn. At cam positions 33 and 34 of the smallest and largest radius of the disc cam 31 arcs are located thereon concentric to the axis of rotation, whereby so-called resting or idling locations are formed which cause no displacement of the parts cooperating therewith.

In the second embodiment shown in FIGS. 4 and 5 the parts which correspond to those of the first embodiment have been designated by the same reference numerals and slightly altered parts are identified by the additional letter "a." The progression or feed control cam 7a in this case, cooperates with a connecting member 41 displaceable in a housing 6a and which carries rollers 42, 43 each mounted on pins, of which the roller 42 engages in a recess of the feed or progression control curve 7a and the roller 43 rests on an axial cam 31a. This is mounted on an extended shaft-like hub 44 of a gear wheel 45 which meshes with a gear wheel 46 co-axial to a bevel gear 12a and fixed on a drive shaft 11a. The connecting or transmission member 41 which is hollow receives a spring 47, which is supported on a cover 48 arranged on the outside of the housing 6a, and a rod 48' passes therethrough which carries on its end remote from the connecting part 41 a piston 50 displaceable in a cylinder 49. The cylinder 49 is secured to a carrier 4a and serves to receive a spring 32a which urges the cam 31a against the roller 43 and the roller 42 against the feed or progression control cam 7a. A set of plate springs 51 additionally disposed in the cylinder 49 serves to absorb shocks. It is also possible to arrange the connecting member 41 on one of the guide bars 5 adapted to be displaced and secured against rotation.

In the second embodiment, which operates in the same way as the first embodiment, the connecting member 41 replaces the double-arm lever 28 and the tappet 29. Here the driving disc corresponding to the driving disc 14 of the first embodiment is also arranged co-axial to the bevel gear corresponding to the bevel gear 13 of the first embodiment so that the shaft 32' of the first embodiment is omitted.

While there is shown and described present preferred embodiments of the invention, it is to be distinctly understood that the invention is not limited thereto but may be otherwise variously embodied and practiced within the scope of the following claims.

We claim:

1. In combination with a machine having a displaceable and indexible turret head including a turret head support housing, a device for applying the turret head to a workpiece, comprising a main control shaft, a first control cam mounted on said main control shaft for controlling advancing movement of the turret head, a second control cam for controlling the displacement movement of the turret head occurring in connection with indexing of the turret head, indexing means for the turret head, a shaft member arranged in the turret head housing rotatable with said indexing means of said turret head, transmission means for operably interconnecting said first control cam and said second control cam, spring means for maintaining the transmission means against said first and second control cams, said second control cam being drivingly connected between said transmission means and said shaft member rotatable with said indexing means.

2. The combination as defined in claim 1, wherein said transmission means incorporates a double-arm lever having one end cooperating with said first control cam, an axially displaceable tappet interposed between the other end of said double-arm lever and said second control cam, said indexing means including a Maltese cross indexing arrangement including a driving cam mounted at said shaft member, said second control cam comprising a radial cam member likewise mounted at said rotatable shaft member.

3. The combination as defined in claim 2, wherein said second control cam possesses regions closest to and most remote from its axis of rotation which are in the form of arcs of a circle to provide a period of idling in said displacement movement.

4. The combination as defined in claim 1, wherein said second control cam comprises an axial cam member mounted upon said shaft member rotatable with said indexing means, said shaft member being disposed substantially parallel to the axis of rotation of said first control cam, drive means for said turret head including mechanism for driving said shaft member, said transmission means including a transmission element which is displaceable substantially parallel to the lengthwise axes of both said first and second control cams.

5. The combination as defined in claim 4, further including a stationary member, a spring element carried by said transmission element, a rod member extending through said spring element into said transmission element, and said maintaining spring means comprising at least one further spring cooperating with said rod member for supporting said rod member with respect to said stationary member.

References Cited

UNITED STATES PATENTS 1,988,675  1/1935  Tessky _____ 74—820

FOREIGN PATENTS 235,621  4/1945  Switzerland _____ 74—820
890,429  2/1962  Great Britain _____ 74—820

WILLIAM F. O'DEA, Primary Examiner
F. D. SHOEMAKER, Assistant Examiner